Dec. 15, 1936.　　　　E. G. GRIFFITH　　　　2,064,257
REVOLVING BIN FOR FRUIT
Filed March 25, 1936　　　2 Sheets-Sheet 1
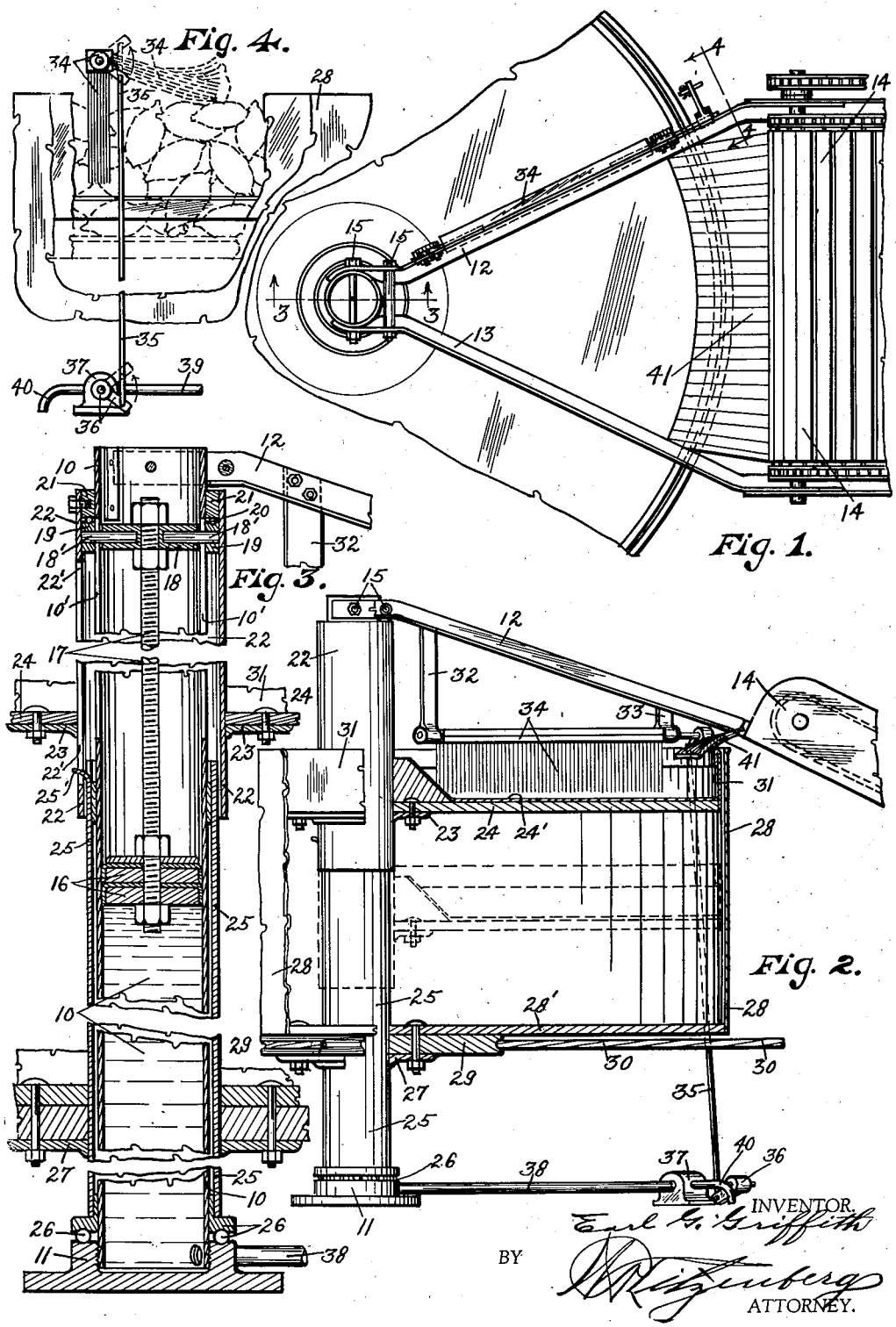

Dec. 15, 1936.　　　　E. G. GRIFFITH　　　　2,064,257
REVOLVING BIN FOR FRUIT
Filed March 25, 1936　　　2 Sheets-Sheet 2
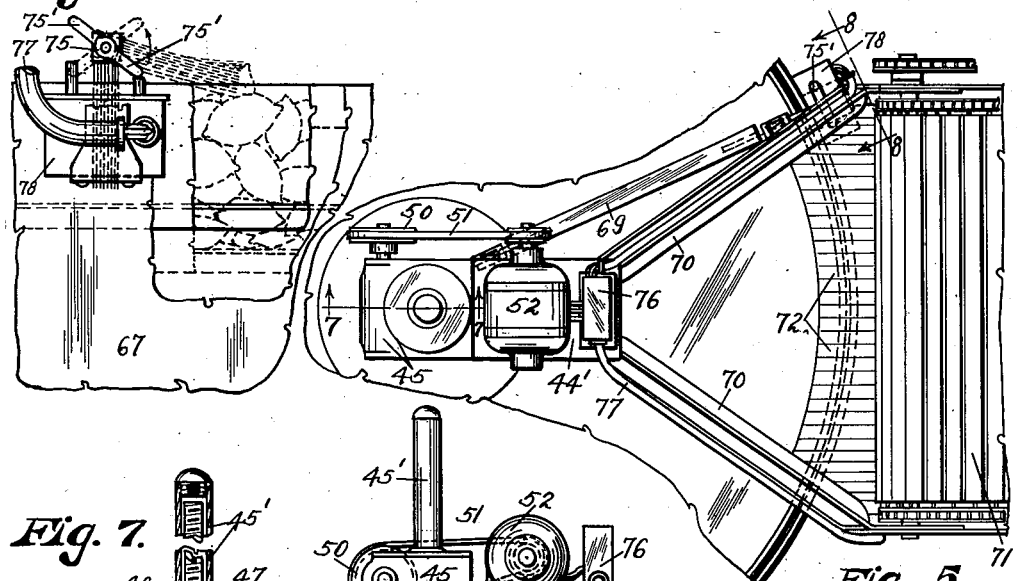
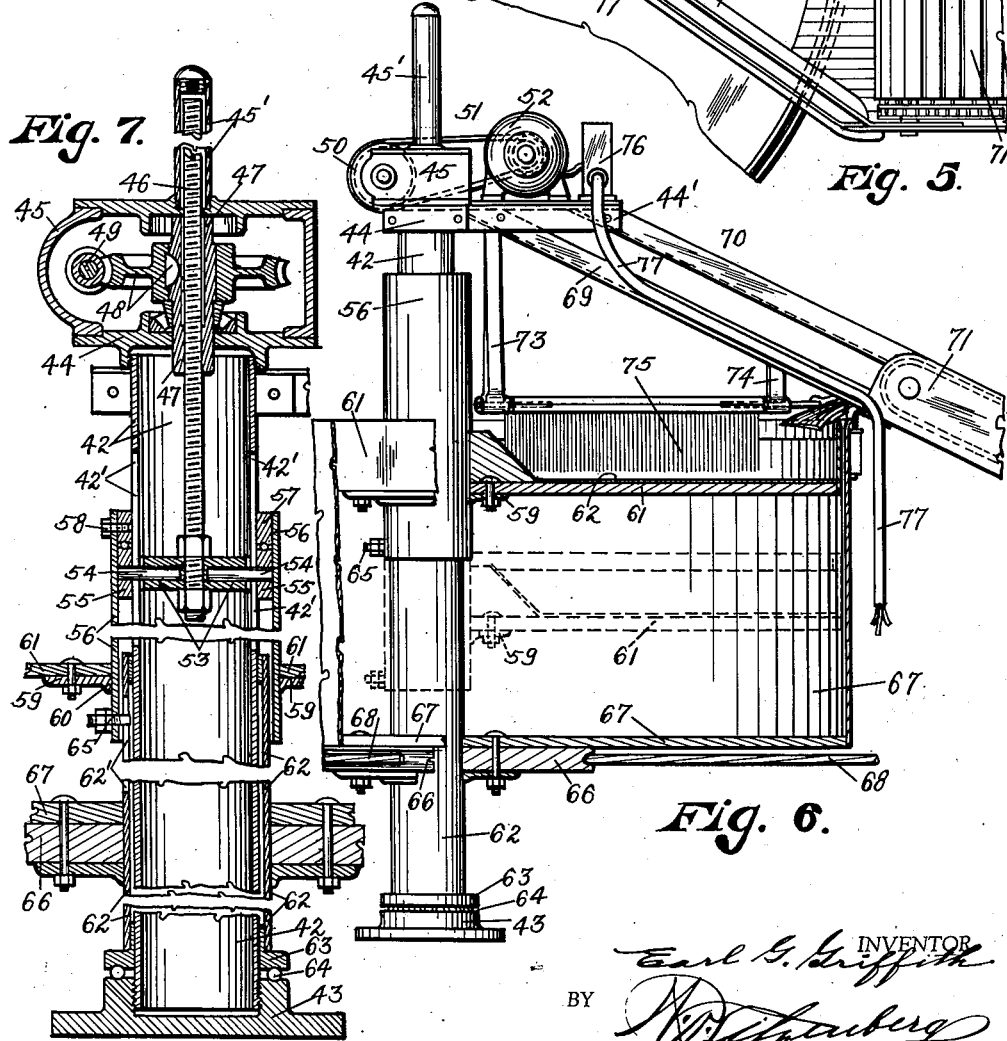

Patented Dec. 15, 1936

2,064,257

UNITED STATES PATENT OFFICE 2,064,257

REVOLVING BIN FOR FRUIT

Earl G. Griffith, Los Angeles, Calif.

Application March 25, 1936, Serial No. 70,854

7 Claims. (Cl. 226—129)

My invention relates to revolving bins or trays used for handling fruit or other articles which are picked therefrom piece by piece by hand, as in the wrapping and packing of oranges, lemons and the like, and the principal object of the invention is to provide a receiving and holding bin or tray movably mounted so as to be maintained at a desired position for the purpose of keeping the top layer of fruit at a constant and convenient level for the convenience of the operator. It is common to have a revolving bin or tray to receive the fruit or other articles being handled and to maintain the top layer more or less level and at a predetermined level for the convenience of the wrappers and in order that greater efficiency may be developed.

I have, after much experience and experimentation, worked out means for automatically maintaining the holding tray at a desired level, regardless of the weight or amount of fruit thereon, in order that the top layer of fruit and from which it is taken by hand piece by piece, may be kept in a constant and convenient position.

I have shown my invention embodied in two different forms on the accompanying two sheets of drawings, which I will now describe.

Figure 1 is a fragmentary top plan view looking down into a receiving bin, showing the upper end of a conveyor for delivering fruit or the like thereto;

Figure 2 is a fragmentary side elevation, partly in vertical section, showing the bin and the vertically movable tray and the upper end of the elevator;

Figure 3 is an enlarged vertical sectional view, taken on the line 3—3 of Fig. 1, showing mechanism for hydraulically raising and lowering the tray; and Figure 4 is a fragmentary view with parts broken away, showing how a movable brush is moved by engagement with the fruit on the tray for operating a valve;

Figure 5 is a fragmentary top plan view, similar to Fig. 1, of the same general mechanism, but constructed to be electrically operated instead of being hydraulically operated;

Figure 6 is a fragmentary side elevation, partly in section;

Figure 7 is an enlarged vertical sectional view, taken on the line 7—7 of Fig. 5; and Figure 8 is a fragmentary view illustrating how a reversing switch is operated by a movable member resting upon the fruit in the bin.

Referring now in detail to the drawings, Figs. 1 to 4 inclusive, a supporting tube or member 10 is screwed at its lower end into a base 11, and at its upper end has secured thereto two angle iron frame members 12 and 13, extended downwardly and outwardly to the edge of the structure for supporting the upper end of an endless conveyor, designated as a whole 14. The upper ends of said frame members 12 and 13 are secured by means of bolts 15, 15, or in any suitable manner. In this form of the invention, the inner tube 10 forms a cylinder in which is a piston 16, connected by means of a rod or screw 17, with a cross member 18, fitting within the tube 10, and receiving at its opposite ends two pins 18', 18', which extend through opposed slots 10', 10', in said inner tube, the outer ends of said pins 18', 18', being anchored in a collar 19, which collar forms the lower runway for a ball bearing, designated 20, the upper collar or member of which 21, is secured within the upper end of an outer tubular member 22, which fits down over said ball bearing mechanism 20, as seen in Fig. 3. Said outer tubular member 22 is shorter than the inner tubular member 10, as shown, and has secured thereto, toward its lower end, an annular flange like member 23, welded or otherwise secured thereto, and which carries a tray 24, as shown in Figs. 2 and 3.

Mounted over the inner tubular member 10, at its lower end, is an outer tubular member 25, seated on an annular ball bearing member 26, running upon the base 11, as shown in Fig. 3, so as to turn on the inner member 10, which is fixedly anchored to the stationary base 11.

Secured to said outer tubular member 25, by welding or otherwise, is a supporting collar or flange 27, upon which is mounted a bin 28, adapted to be revolved by means of a pulley 29, secured to the underside thereof on said outer tubular member 25, whereby said bin 28, pulley 29, and outer tubular member 25 revolve together on said ball bearing 26. It will be noted that the lower outer tubular member 25, while outside of the inner tubular member 10 telescopes within the upper outer tubular member 22, which carries the tray 24. Said lower tubular member 25 is provided with struck out tongues, as 25', which protrude through slots, as 22' in the upper outer tubular member 22, whereby to turn said tubular members 22 and 25 together, thus revolving the tray 24 and the bin 28 together, while permitting the upper tubular member 22 to be raised and lowered with the piston 16 and its connection at 18—19—21. Said members are revolved from any suitable source, through a belt 30 to the pulley 29 on the tray 28, and before described. The tray 24 fits within said bin and is provided on its upper surface with a pad or cushion, 24'. The outer edge of said tray is provided with an outer band, as 31, within the bin 28, said tray being shown in full lines at the top of the bin, and in light broken lines at about midway position therein.

Suspended from the frame member 12, as seen in Fig. 2, are two hangers, 32, and 33, supporting a rockable brush or member 34, adapted to rest upon the fruit in the tray and to be swung from a down position to a raised position, as indicated in Fig. 4. A single lemon, for example, if above the general level of the fruit on the tray, will not be sufficient to move the brush, but will push its way through the brush as indicated in light broken lines, Fig. 4. As the level of the fruit in the tray rises, the brush is swung to the horizontal position, and this causes the movement of a rod or link 35, connected at its lower end with a valve lever 36, of a three-way valve, designated as a whole 37, which controls the communication, through pipe 38, with the lower end of the cylinder 10, as seen in Fig. 3. The supply of liquid or fluid to said valve 37 is through pipe 39, with the outlet 40. When the brush is raised, as indicated in broken lines in Fig. 4, the valve is operated to let the piston 16 move downwardly and with it the tray, and when the brush is down, as seen in full lines, the valve is operated to permit the fluid to enter the cylinder 10 and to raise the piston and the tray, so that the tray is automatically raised and lowered as the fruit builds up in the tray and the fruit level or position for the top layer of fruit is thus determined and maintained at a predetermined position for the greatest convenience of those who stand along side of the bin and have to pick the fruit piece by piece by hand, wrap it and deposit it in the box.

As the fruit is conveyed from the wash vat (not shown) by the endless elevator 14, it is deposited upon a flexible canvas or other apron-like member 41, and thence into the tray. Any suitable deposit cushion or apron means can be used to avoid possible bruising of the fruit as it is deposited on the tray 24.

Referring to Figs. 5 to 8 inclusive, I will describe the electrically operated apparatus, which is similar in most features to that already described.

An inner tubular member 42, is screwed into a base member 43 at its lower end and is provided with opposed slots, as 42', 42' toward its upper end. Upon the upper end of said tubular member 42, is mounted a table or supporting casting 44, and worm box 45, through which is mounted a screw 46, with a sleeve 47 threaded thereon. Keyed to said sleeve is a worm gear or wheel 48, operated by a worm 49, provided on its outer end with a pulley 50, driven by a belt 51, from a motor 52, all supported on the upper end of said inner tubular member 42. The upper end of the screw 46, runs up into a box extension 45', when it is raised by turning the worm and worm gear, 49—48.

The lower end of said screw 46 is provided with a cross head member 53, secured thereto and having extension pins 54, 54, which extend out through the slots 42', 42' of the tubular member 42, as shown and are anchored in a collar 55, fitted within an outer tubular member 56. Secured within the upper end of this outer tubular member 56, is a collar 57, secured with a set screw or screw bolt 58, with ball bearings between said collars 55 and 57, as shown, whereby said outer tubular member 56 can be turned. Mounted on said tubular member 56, is a tray support, 59, welded or otherwise secured thereto, as at 60, and upon which the fruit tray 61 is mounted. A pad 61 is mounted on said tray, as indicated.

A lower outer tubular member 62 is mounted over the lower end of the inner tubular member 42, and is seated on a ball bearing member 63, with the balls 64 between it and said base member 43, as indicated. The upper end of said tubular member 62 telescopes into the upper outer tubular member 56, and around the inner tubular member 42, as shown, and said outer tubular member 56 is provided with a screw bolt 65, having its inner end working in a slot 62', whereby said tubular member 56, carrying the tray 61, is turned with the tubular member 62, when the latter is revolved. A pulley 66 is secured to the tubular member 62, and upon the pulley is supported a bin 67 to revolve with said pulley 66, and said tubular member 62, when said pulley is driven by the belt 68, from any suitable source of driving power. Thus the turning of the bin 67, through the pulley 66, turns the tubular member 62, and through the bolt 65, turns the upper tubular member 56 and with it the tray 61, within the bin, as indicated.

Secured to the table or support at the upper end of the inner tubular member 42, are two pairs of inclined frame members, 69—70, at the lower ends of which the upper end of the endless elevator 71 is supported, as indicated. Said elevator deposits the fruit from the wash vat (not shown) on to a flexible apron, as 72. Suspended from said frame members 69, are two hangers, 73 and 74, which support a movable brush 75, adapted to rest upon the top of the fruit in the tray and to be moved by engagement with said fruit from the vertical position to a horizontal position, as indicated in light broken lines in Fig. 8.

Mounted on the supporting table 44 and its extension 44', is a magnetic switch box 76, to which runs the lead-in wires 77, and from which said wires lead to a remote control operating switch 78, at the lower ends of the frame members 69—70, also shown in Fig. 8, for reversing the motor. This is accomplished by the arms 75', 75', operated by the rocking of the brush or member 75, from one position to the other for alternately operating the two plungers of said reversing switch. As these switches and electrical connections are all standard equipment and are well understood by those versed in the art, they need not be illustrated or described more in detail.

It will thus be seen that I have provided a movable brush, or member, 75, positioned to be engaged by the fruit as it accumulates upon the revolving tray, 61, and to be moved thereby for the purpose of automatically causing the operation of the power means, whether hydraulic or electric, to raise or lower said tray so that the level of the fruit in the tray will be automatically maintained in the most convenient position for the operators who wrap and pack the fruit. By providing means for raising and lowering the fruit-receiving tray in the bin, a predetermined level can be maintained and the matter of manually picking up the fruit piece by piece greatly facilitated.

While I have shown and described two methods or means for raising and lowering the tray for this purpose, I am aware that other means can be used without departing from the spirit of my invention, and I do not, therefore, limit the invention to the showing made for descriptive purposes, except as I may be limited by the hereto appended claims.

I claim:

1. In combination, a fruit receiving bin, revolubly supported, a tray movably and revolubly supported in said bin, whereby to be revolved and to be raised and lowered therein, means for causing said tray to revolve with fruit thereon, power means for raising and lowering said tray to different levels in said bin, and means mounted over said tray and adapted to be moved by engagement with fruit on said tray, said means being connected for controlling said power means.

2. In combination, a bin, a fruit receiving tray mounted therein to be raised and lowered and to be revolved, means for causing the rotation of said tray, power means for raising and lowering said tray in said bin, means for causing said power means to operate to raise or lower said tray, and means actuated by engagement with fruit on said tray for operating the means for causing said power means to operate.

3. In combination, a bin, a fruit receiving tray mounted in said bin to be revolved and to be raised and lowered to different levels therein, means for causing the revolution of said tray, power means for raising and lowering said tray, and means for controlling said power means consisting of a movable member supported above said tray and adapted to be moved by engagement therewith of fruit in said tray at different levels, whereby the position of the fruit in said tray automatically causes the actuation of said power means.

4. In combination, a bin revolubly supported, a tray revolubly supported in said bin, power means for raising and lowering said tray in said bin to different levels, said power means being adapted to be set in operation to raise or to lower said tray automatically, and a brush member movably supported above said tray and adapted to be moved by engagement with fruit on said tray, said brush member being operatively connected for causing the operation of said power means when said brush member is moved to different positions relative to fruit on said tray.

5. A fruit-receiving holder revolubly mounted and adapted to be raised and lowered axially, power means for raising and lowering the same, and a brush-like member movably supported above said holder, adapted to be moved by engagement with fruit upon said holder, said brush-like member being operatively connected with said power means for raising and lowering said holder, whereby to automatically maintain a constant level for the top layer of fruit on said holder.

6. An apparatus for receiving and holding fruit for wrapping and packing and including a receiving tray revolubly mounted, means for causing the same to revolve, means supporting said tray for axial movement, whereby it can be raised and lowered, power means for moving said tray axially in opposite directions, a movable member supported above said tray and adapted to be engaged and moved by the top layer of fruit on said tray, and operative connections from said movable member to said power means for automatically causing the operation of said power means to move said tray axially.

7. In an apparatus for holding fruit and the like to be handled piece by piece, a receiving and holding tray-like body revolubly supported to turn about a vertical axis, means supporting said body for axial movement, means for revolving said body, power means for raising and lowering said body axially to different levels, a brush positioned radially above said body and movable by engagement with fruit on said tray-like body, operating connections from said brush to said power means for causing the operation of the latter by the movement of said brush, and means for feeding fruit to said tray-like body as it revolves.

EARL G. GRIFFITH.